(12) United States Patent
Blackwell et al.

(10) Patent No.: US 11,509,032 B2
(45) Date of Patent: Nov. 22, 2022

(54) RADIO FREQUENCY WAVEGUIDE SYSTEM INCLUDING CONTROL REMOTE NODE THERMAL COOLING

(71) Applicant: Raytheon Technologies Corporation, Farmington, CT (US)

(72) Inventors: Geoffrey T. Blackwell, Lebanon, CT (US); Richard A. Poisson, Avon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 221 days.

(21) Appl. No.: 17/072,138

(22) Filed: Oct. 16, 2020

(65) Prior Publication Data
US 2022/0120221 A1    Apr. 21, 2022

(51) Int. Cl.
| | |
|---|---|
| H04B 3/52 | (2006.01) |
| F02C 7/18 | (2006.01) |
| H01P 1/30 | (2006.01) |
| F01D 25/12 | (2006.01) |

(52) U.S. Cl.
CPC ............... *H01P 1/30* (2013.01); *F02C 7/185* (2013.01); *H04B 3/52* (2013.01); *F01D 25/12* (2013.01); *F05D 2220/32* (2013.01); *F05D 2260/232* (2013.01)

(58) Field of Classification Search
CPC ........ F02C 7/185; F02K 3/06; F05D 2220/32; F05D 2260/232; F01D 25/12; H01P 1/30; H01P 5/107; H04B 3/52; H04B 1/02; H04B 1/3822; H04B 15/025; H04L 67/12; H04L 2012/40273
See application file for complete search history.

(56) References Cited

U.S. PATENT DOCUMENTS

| | | | |
|---|---|---|---|
| 4,688,007 A * | 8/1987 | Krill | ................ H01P 1/30 333/248 |
| 6,038,878 A | 3/2000 | Pfister et al. | |
| 7,231,180 B2 | 6/2007 | Benson et al. | |
| 9,303,523 B2 | 4/2016 | Rodriguez et al. | |
| 9,986,310 B2 | 5/2018 | Sobanski et al. | |
| 10,031,032 B2 | 7/2018 | Desilva et al. | |

(Continued)

FOREIGN PATENT DOCUMENTS

| | | |
|---|---|---|
| EP | 3291040 A1 | 3/2018 |
| WO | 2016038947 A1 | 3/2016 |

OTHER PUBLICATIONS

Search Report issued in European Application No. 21203028.2; Application Filing Date Oct. 15, 2021; dated Mar. 30, 2022 (5 pages).

*Primary Examiner* — David S Huang
(74) *Attorney, Agent, or Firm* — Cantor Colburn LLP

(57) ABSTRACT

A radio frequency waveguide communication system includes a guided electromagnetic transmission network, and a cooling air source. The guided electromagnetic transmission network includes one or more remote node in fluid communication with one or more waveguides. The cooling air source is in fluid communication with the guided electromagnetic transmission network and is configured to provide pressurized cooling air to the waveguide. The waveguides direct the pressurized cooling air to the remote node.

20 Claims, 5 Drawing Sheets

(56) References Cited

U.S. PATENT DOCUMENTS

| | | |
|---|---|---|
| 10,280,787 B2 | 5/2019 | Pratt et al. |
| 10,307,138 B2 | 6/2019 | Heims et al. |
| 10,309,342 B2 | 6/2019 | Mueller et al. |
| 10,411,756 B2 | 9/2019 | Snyder et al. |
| 2006/0052661 A1* | 3/2006 | Gannot .................. A61B 5/015 606/11 |
| 2014/0309717 A1* | 10/2014 | Gustavsson .......... A61N 5/0613 607/90 |
| 2019/0212435 A1 | 7/2019 | Pfeifer et al. |
| 2022/0094032 A1* | 3/2022 | Deleniv ................ H01Q 13/06 |

* cited by examiner

RADIO FREQUENCY WAVEGUIDE SYSTEM INCLUDING CONTROL REMOTE NODE THERMAL COOLING

BACKGROUND

This disclosure relates to electromagnetic communication systems, and more particularly to a cooling system for a radio frequency signal communication of a vehicle.

Detailed knowledge of machinery operation for control and/or health monitoring of a vehicle typically require sensing systems capable of obtaining information from locations that are sometimes difficult to access due to moving parts, internal operating environment and/or machine configuration. The access limitations make wire routing bulky, expensive and vulnerable to interconnect failures. The sensor and interconnect operating environments for desired sensor locations often exceed the capability of the interconnect systems. In some cases, cable cost, volume and weight exceed the desired limits for practical applications.

Application of electromagnetic sensor and effector technologies to address the wiring constraints faces the challenge of providing reliable communications in a potentially unknown environment with potential interference from internal or external sources. Large-scale deployments of multiple sensors and/or effectors with varying signal path lengths further increases the challenges of normal operation and fault detection in a network of connected nodes. High temperature environments further constrain sensor system components.

BRIEF DESCRIPTION

According to a non-limiting embodiment, a radio frequency waveguide communication system comprises a guided electromagnetic transmission network, and a cooling air source. The guided electromagnetic transmission network includes one or more remote nodes in fluid communication with one or more waveguides. The cooling air source is in fluid communication with the guided electromagnetic transmission network and is configured to provide pressurized cool air to the at least one waveguide. The waveguides direct the pressurized cool air to the remote node.

According to another non-limiting embodiment, a method of cooling a radio frequency waveguide communication system includes providing pressurized cool air via a cooling air source, and delivering the pressurized cool air to a guided electromagnetic transmission network that includes at least one remote node in fluid communication with at least one waveguide. The method further includes directing, via the at least one waveguide, the pressurized cool air to the at least one remote node.

A technical effect of the of the present teachings described herein is achieved by providing an RF interface module that dynamically establishes an interchangeable communication interface between an RF-based controller and one or more pre-existing legacy sensors included in a sensor node of an RF waveguide communication system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Application of electromagnetic sensor and effector technologies to address the wiring constraints faces the challenge of providing reliable communications in a potentially unknown environment with potential interference from internal or external sources. RF waveguide communications and power systems employed in gas turbine engine systems, for example, can offer higher bandwidth, reduced weight, smaller footprint, and greater reliability. However, thermal environments at remote nodes of the RF waveguide system can reach temperatures high enough to damage the electronics installed therein. In terms of nodes that are installed in high-temperature areas of the turbine engine, the high temperatures can damage the processor and integrated circuitry needed to communicate data back and forth between the sensor(s) and the controller. Additional components (e.g., fans) for actively cooling the electronics can be implemented; however, the additional cooling components increase weight, costs and power resources of the overall RF waveguide communications and power system.

At least one or more non-limiting embodiments described herein provides a RF waveguide system that provides controlled remote node thermal cooling capabilities. The RF waveguide system includes one or more remote nodes in signal communication with a controller via one or more waveguides. The waveguides include hollow conduits capable of flowing forced (e.g., pressurized) cool air therethrough. In one or more non-limiting embodiments, either preconditioned air generated by an ACM for cabin/cockpit use or a dedicated air heat exchanger that converts heated pressurized engine bleed air into pressurized cool air can be utilized to provide the cool air that is directed into the waveguides. The cooled air is then directed to the remote nodes and over the remote node electronic components. In this manner, the temperatures of the surrounding remote node along with the individual temperatures of the electrical components are decreased. Accordingly, the need to employ additional active components can be reduced or avoided.

Figure 1:
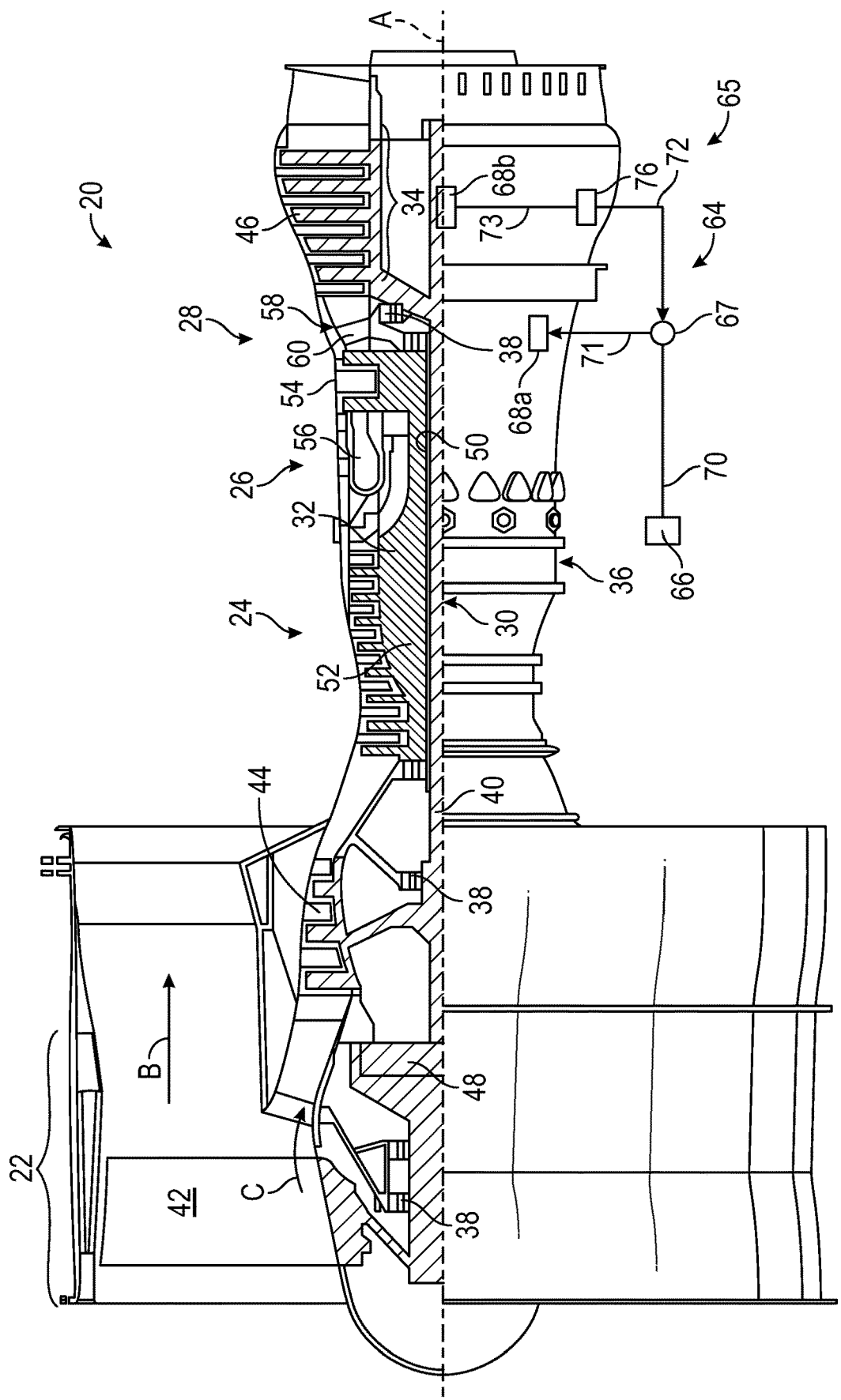
FIG. 1 is a cross-sectional view of a gas turbine engine as an example of a machine according to a non-limiting embodiment of the disclosure.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems. Examples can include various moderate to high temperature environments, such as glass and metal forming systems, petroleum-oil-and-gas (POG) systems, ground-based turbine for energy generation, nuclear power systems, and transportation systems.

With continued reference to FIG. 1, the exemplary engine 20 generally includes a low speed spool 30 and a high-speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high-speed spool 32 includes an outer shaft 50 that interconnects a second (or high) pressure compressor 52 and a second (or high) pressure turbine 54. A combustor 56 is arranged in exemplary gas turbine engine 20 between the high-pressure compressor 52 and the high-pressure turbine 54. A mid-turbine frame 58 of the engine static structure 36 is arranged generally between the high-pressure turbine 54 and the low-pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low-pressure compressor 44 then the high-pressure compressor 52, mixed and burned with fuel in the combustor 56, then expanded over the high-pressure turbine 54 and low-pressure turbine 46. The mid-turbine frame 58 includes airfoils 60 which are in the core airflow path C. The turbines 46, 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low-pressure turbine 46 as related to the pressure at the outlet of the low-pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low-pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an effector node that can drive one or more effectors/actuators of the gas turbine engine 20. Node 68b is an example of a sensor node that can interface with one or more sensors of the gas turbine engine 20. Nodes 68a, 68b can include processing support circuitry to transmit/receive electromagnetic signals between sensors or effectors and the controller 66. A coupler 67 can be configured as a splitter between a waveguide 70 coupled to the controller 66 and waveguides 71 and 72 configured to establish guided electromagnetic transmission communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the electromagnetic signals between the controller 66 and one or more of the nodes 68a, 68b. In embodiments, the waveguides 70-73 can be hollow metal tubes. The disclosed system 64 may be utilized to control and/or monitor any component function or characteristic of a turbomachine, aircraft component operation, and/or other machines.

Prior control & diagnostic system architectures utilized in various applications include centralized system architecture in which the processing functions reside in an electronic control module. Redundancy to accommodate failures and continue system operation systems can be provided with dual channels with functionality replicated in both control channels. Actuator and sensor communication are accomplished through analog wiring for power, command, position feedback, sensor excitation and sensor signals. Cables and connections include shielding to minimize effects caused by electromagnetic interference (EMI). The use of analog wiring and the required connections limits application and capability of such systems due to the ability to locate wires, connectors and electronics in small and harsh environments that experience extremes in temperature, pressure, and/or vibration. Exemplary embodiments can use radio frequencies guided by waveguides 70-73 in a guided electromagnetic transmission architecture to provide both electromagnetic signals and power to the individual elements of the network 65.

The use of electromagnetic radiation in the form of radio waves (e.g., ranging from MHz to GHz) to communicate and power the sensors and effectors using a traditionally complex wired system provides substantial architectural simplification, especially as it pertains to size, weight, and power (SWaP). Embodiments of the invention may provide extension of a network where reduced SNR would compromise network performance by trading off data rates for an expansion of the number of nodes and distribution lines; thereby providing more nodes/sensors, with greater interconnectivity.

Figure 2:
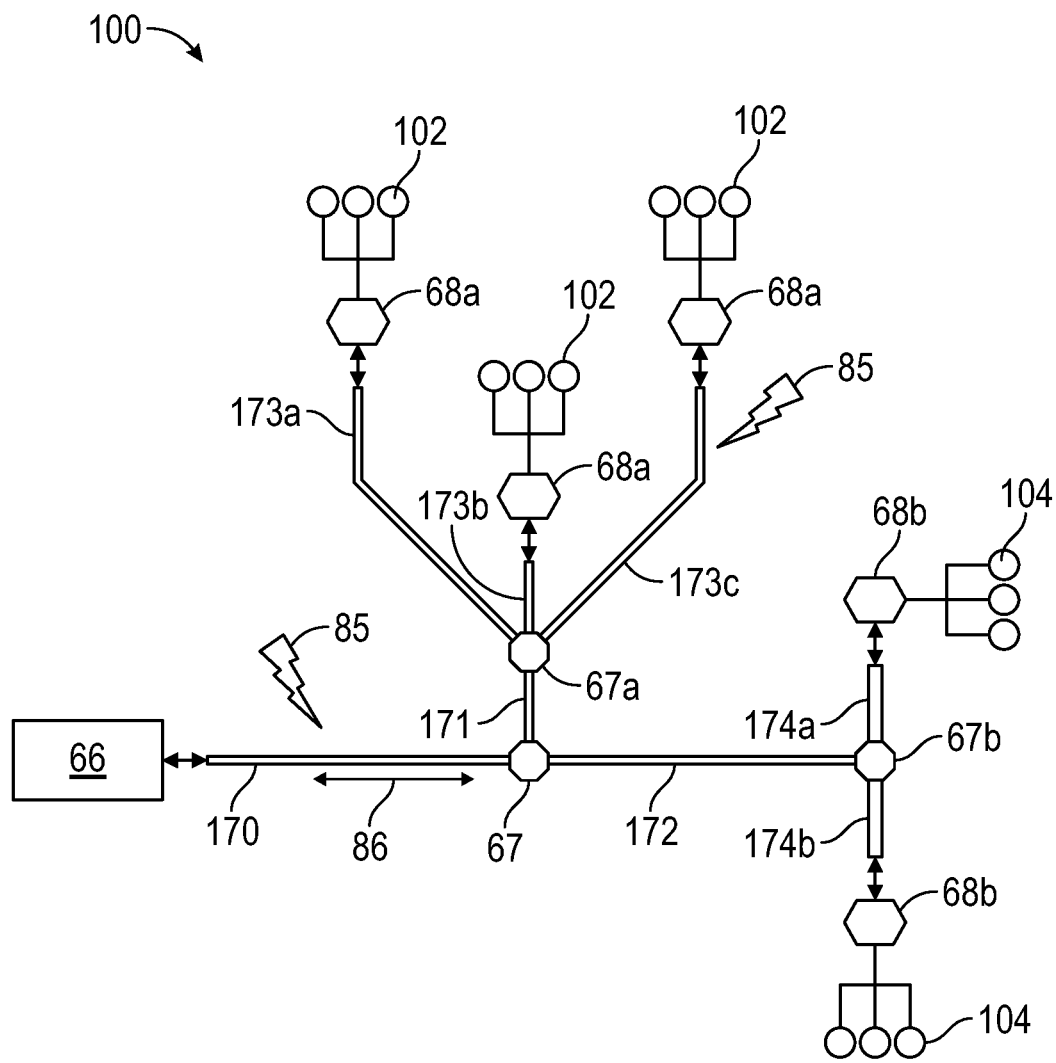
FIG. 2 is a schematic view of a guided electromagnetic transmission network in accordance with a non-limiting embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Couper 67a is further coupled to three nodes 68a through waveguides 173a, 173b, 173c in parallel. Each of the nodes 68a can interface or be combined with multiple effectors 102. Coupler 67b is also coupled to two nodes 68b through waveguides 174a, 174b in parallel. Each of the nodes 68b can interface or be combined with multiple sensors 104. Although the example of FIG. 2 depicts connections to effectors 102 and sensors 104 isolated to different branches, it will be understood that effectors 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize electrical wire, optic fiber, waveguide or any other electromagnetic communication including radio frequency/microwave electromagnetic energy, visible or non-visible light. The interface between the controller 66 and nodes 68a, 68b can transmit power and signals.

The example nodes 68a, 68b may include radio-frequency identification (RFID) devices along with processing, memory and/or the interfaces to connect to conventional sensors or effectors, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and allow unauthorized access to information. In some embodiments, guided electromagnetic radiation is in the range 1-100 GHz.

The nodes 68a with effectors 102 may include control devices, such as a solenoid, switch or other physical actuation devices. RFID, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation.

It should be appreciated that while the system 64 is explained by way of example with regard to a gas turbine engine 20, other machines and machine designs can be modified to incorporate built-in shielding for each monitored or controlled components to provide the use of a guided electromagnetic transmission network. For example, the system 64 can be incorporated in a variety of harsh environment machines, such as an elevator system, heating, ventilation, and air conditioning (HVAC) systems, manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

Figure 3:
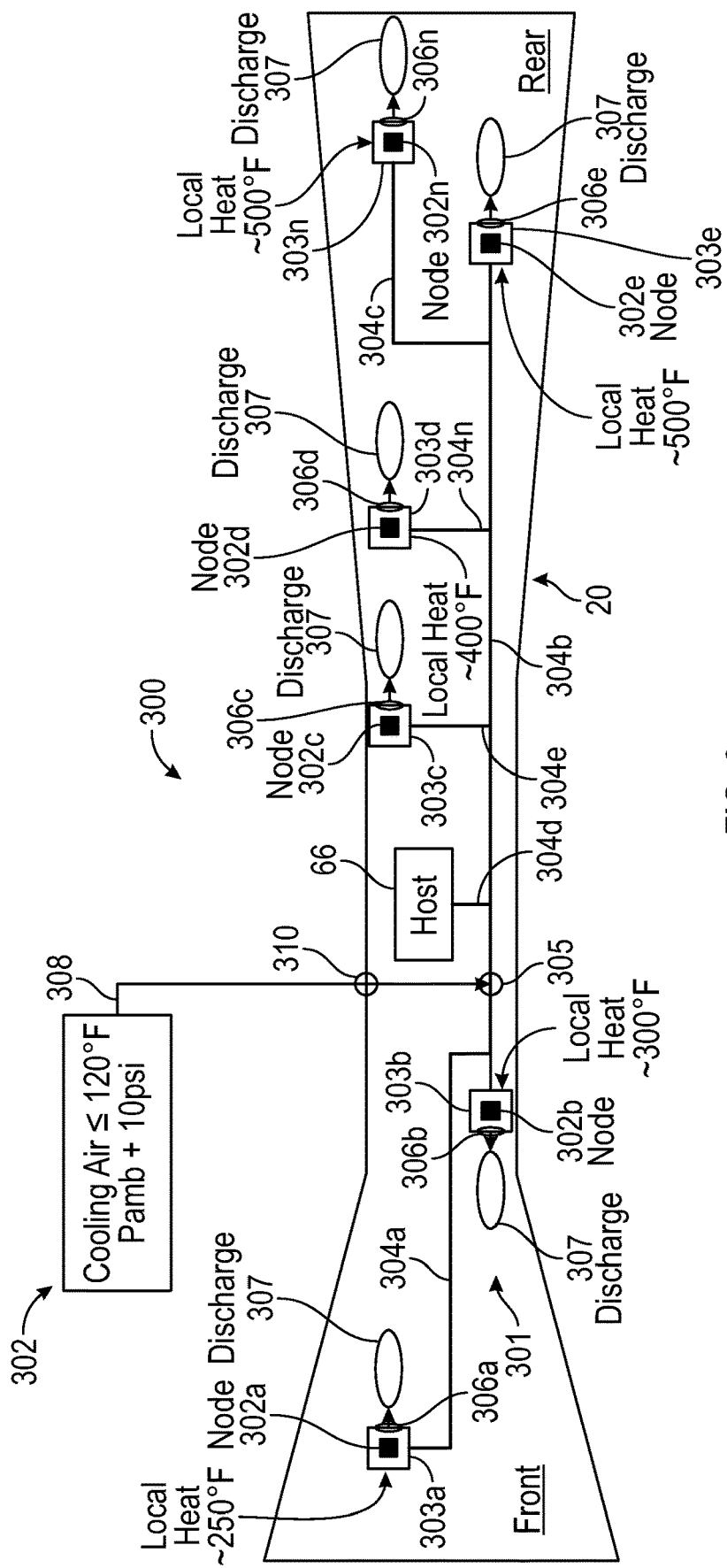
FIG. 3 depicts a radio frequency (RF) waveguide communication system including controlled remote node thermal cooling capabilities according to a non-limiting embodiment of the disclosure.

Turning now to FIG. 3, a RF waveguide communication system 300 configured to provide controlled remote node thermal cooling capabilities is illustrated according to a non-limiting embodiment. The RF waveguide communication system 300 includes a guided electromagnetic transmission network 301 and a cooling air source 302. The guided electromagnetic transmission network 301 can be installed in a machine such as, for example, a gas turbine engine 20. The guided electromagnetic transmission network 301 includes one or more remote nodes 302a, 302b, 302c, 302d, 302e . . . 302n (collectively referred to as 302a-302n), a controller 66, and one or more waveguides 304a, 304b, 304c, 304d, 304e, . . . 304n (collectively referred to as 304a-304n). Each remote node 302a-302n can include a node housing 303a, 303b, 303c, 303d, 303e, . . . 303n (collectively referred to as 303a-303n). The node housing can contain and protect various electronic components including, but not limited to, a processor and/or integrated circuitry. The housing can include a respective discharge port 306a-306n formed therein. The discharge port 306a-306n is configured to expel air from a respective remote node 302a-302n. In one or more non-limiting embodiments, the discharge port 306a-306n can include a cover that blocks electromagnetic signals (e.g., RF energy) from passing therethrough while allowing the cooled air to pass. In examples where the guided electromagnetic transmission network 301 is installed in a gas turbine engine 20, the remote discharge port 306a-306n is in fluid communication with a casing outlet 307 formed in the engine casing.

One or more air passages can connect each discharge port 306a-306n to a respective casing outlet 307 in the engine casing such that the pressurized cool air can be expelled from the remote node 302a-302n and ultimately from the gas turbine engine 20.

The waveguides 304a-304n are configured to establish signal communication between the remote nodes 302a-302n and the controller 66. The controller 66 is configured to communicate with the remote node 302a-302n (e.g., a processor and/or integrated circuitry) through electromagnetic signals. Each waveguide 304a-304n includes a hollow body formed from various known rigid materials. The hollow body of a respective waveguide 304a-304n extends from a first end to an opposing second end. One or more of the waveguides 304a-304n can include an air inlet 305 configured to direct air flow therein. Accordingly, the waveguides 304a-304n can covey the air flow throughout the guided electromagnetic transmission network 301 and to each remote node 302a-302n. The pressurized cool air can also be directed over the controller 66. Accordingly, the cool air can decrease the temperature of the electrical components located at a respective remote node 302a-302n, along with reducing the temperature of the controller 66.

The cooling air source 302 is in fluid communication with the guided electromagnetic transmission network 301 and is configured to provide preconditioned pressurized cool air. In one or more non-limiting embodiments, the cool air provided by the air source 302 has a temperature, for example, of less than about 120 degrees Fahrenheit (° F.) (about 50 degree Celsius (° C.)), and an ambient pressure, for example, of about 10 pounds per square inch (psi) (about 7 kilopascals (kPa)), or greater. In examples where the guided electromagnetic transmission network 301 is installed in a gas turbine engine 20 of an aircraft, the cooling air source 302 can include an air cycle machine (ACM) configured to generate preconditioned pressurized cool air for cabin and/or cockpit use. The output pressurized cool air can then be tapped and delivered to the electromagnetic transmission network 301. In another example, the cooling air source 302 includes a heat exchanger that converts heated bleed air tapped from the gas turbine engine 20 into pressurized cool air. The pressurized cool air is then delivered to the electromagnetic transmission network 301.

In examples where the guided electromagnetic transmission network 301 is installed in a gas turbine engine 20, the cooling air source 302 includes an outlet 308 in fluid communication with a casing inlet 310. The casing inlet 310 is in fluid communication with the air inlet 305 of a respective waveguide (e.g., waveguide 304b) to deliver the pressurized cool air provided by the cooling air source 302 into the waveguide 304b and thus into the guided electromagnetic transmission network 301. An air passage may connect the casing inlet 310 to the air inlet 305. Once delivered into the guided electromagnetic transmission network 301, the waveguides 304a-304n can direct the pressurized cool air to the remote node 302a-302n.

According to a non-limiting embodiment, the guided electromagnetic transmission network 301 extends from a first portion to a second portion, and may vary air flow of the pressurized cooling flowing between the first portion and the second portion. According to a non-limiting embodiment, for example, the guided electromagnetic transmission network 301 extends from a first end to an opposing second end to define a length. In examples where the RF waveguide communication system 300 is utilized with a gas turbine engine 300, the first end of the guided electromagnetic transmission network 301 is located at the front of engine adjacent to a turbine or fan at the front of the engine 20, while the second end is disposed at the rear of the engine adjacent to a compressor or combustor. The rear of the engine near typically experiences higher temperatures due to operation of the compressor/condenser compared to the front of the engine. Accordingly, temperatures of the guided electromagnetic transmission network 301 increase as the waveguides 304a-304n extend from the front of the gas turbine engine 20 to the rear.

Figure 4:
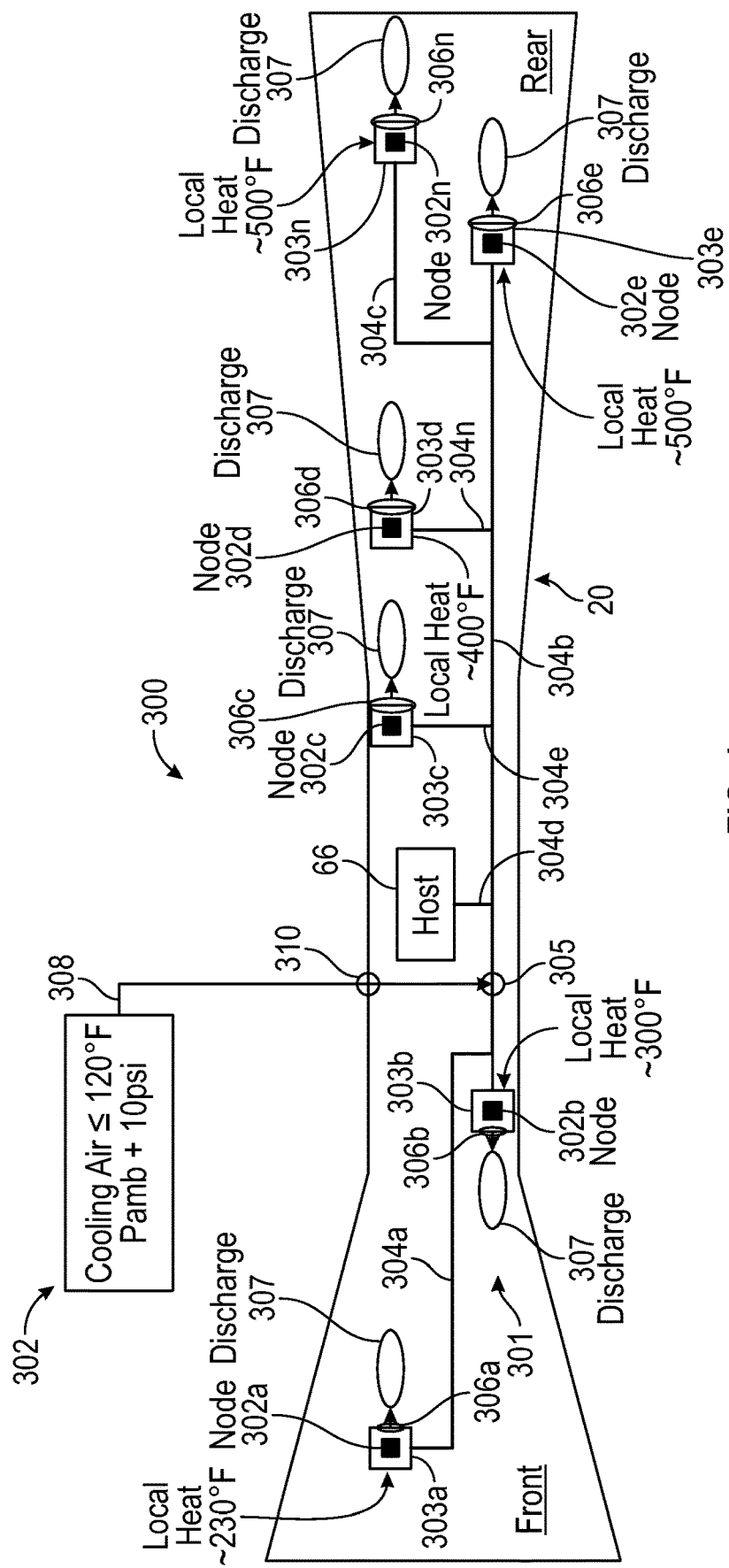
FIG. 4 depicts a radio frequency (RF) waveguide communication system including controlled remote node thermal cooling capabilities according to another non-limiting embodiment of the disclosure.

To take into account the variations in temperatures within the gas turbine engine 20, the guided electromagnetic transmission network 301 can be configured to vary the flow of the cool air along its length. For example, nodes 302a and 302b can include discharge ports 306a and 306b having a first size (e.g., diameter), while nodes 302c, 302d, 302e and 302n can include discharge ports 306c, 306d, 306e and 306n having a second size (e.g., diameter) that is larger than the first size of discharge ports 306a and 306b (see FIG. 4). Accordingly, the smaller sized discharge ports 306a and 306b expel the pressurized cool air at a lower flow rate compared to the larger sized discharge ports 306c, 306d, 306e and 306n. In this manner, the smaller sized discharge ports 306a, 306b force a greater portion of cool air toward the rear of the engine 20 where the air flow realizes less pressure to exit the guided electromagnetic transmission network 301. Accordingly, the guided electromagnetic transmission network 301 can be designed such that a greater amount of pressurized cool air is forced toward the rear of the gas turbine engine 20 to take into account higher temperatures compared to temperatures present at the front of the engine 20.

Figure 5:
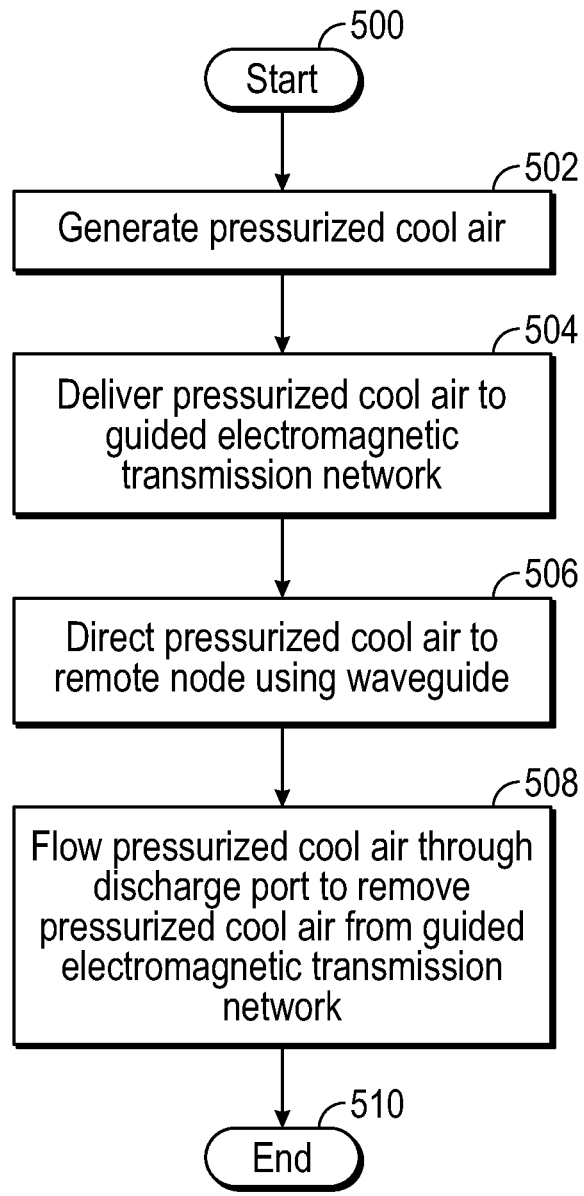
FIG. 5 depicts a flow diagram illustrating a method of cooling a radio frequency waveguide communication system according to a non-limiting embodiment of the disclosure.

Referring now to FIG. 5, a method of cooling a radio frequency waveguide communication system is described according to a non-limiting embodiment of the inventive teachings. The method begins at operation 500, and at operation 502 pressurized cool air is generated. At operation 504, the pressurized cool air is delivered to a guided electromagnetic transmission network included in the radio frequency waveguide communication system. The guided electromagnetic transmission network includes one or more remote nodes in fluid communication with one or more hollow waveguides. In one or more embodiments, an air inlet is formed in the body of one or more of the waveguides so as to direct the pressurized cool air into the waveguide. At operation 506, one or more of the waveguides direct the pressurized cool air to one or more of the remote nodes. The cool air reduces the environment surrounding the remote node and/or reduced the temperature of the remote node itself. At operation 508, the pressurized cool air is removed from the remote node, and thus removed from the guided electromagnetic transmission network. In one or more embodiments, a discharge port is formed in a housing of the remote node so as to exhaust the pressurized cool air from the remote node and the guided electromagnetic transmission network, and the method ends at operation 510.

As described herein, various non-limiting embodiments provide a RF waveguide system that provides controlled remote node thermal cooling capabilities. The RF waveguide system includes one or more remote nodes in signal communication with a controller via one or more waveguides. The waveguides include hollow conduits capable of flowing forced (e.g., pressurized) cool air therethrough. In one or more non-limiting embodiments, preconditioned air generated by an air cycle machine (ACM) for cabin/cockpit use or a dedicated air heat exchanger that converts heated pressurized engine bleed air into pressurized cool air can be utilized to provide the cool air that is directed into the waveguides. The pressurized cooled air is then directed to the remote nodes and over the remote node electronic components. In this manner, the temperatures of the surrounding remote node along with the individual temperatures of the electrical components are decreased The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A radio frequency waveguide communication system comprises:
   a guided electromagnetic transmission network including a remote node in fluid communication with a waveguide; and
   a cooling air source in fluid communication with the guided electromagnetic transmission network and configured to provide pressurized cooling air to the waveguide,
   wherein the waveguide directs the pressurized cooling air to the remote node.

2. The radio frequency waveguide communication system of claim 1, further comprising a discharge port in fluid communication with the guided electromagnetic transmission network and configured to discharge the pressurized cooling air from the guided electromagnetic transmission network.

3. The radio frequency waveguide communication system of claim 2, wherein the remote node includes a node housing, and wherein the discharge port is formed in the node housing to expel the pressurized cooling air from the node housing.

4. The radio frequency waveguide communication system of claim 3, wherein each waveguide includes a hollow body extending from a first end to an opposing second end, and the hollow body of the waveguide includes an air inlet configured to receive air flow.

5. The radio frequency waveguide communication system of claim 4 wherein the cooling air source includes an outlet in fluid communication with the air inlet of the hollow body to deliver the pressurized cooling air into the waveguide.

6. The radio frequency waveguide communication system of claim 2, wherein:
   the guided electromagnetic transmission network extends from a first an opposing second end to define a length, and
   the guided electromagnetic transmission network varies air flow of the pressurized cool air along the length.

7. The radio frequency waveguide communication system of claim 6, wherein a first portion of the pressurized cooling air is delivered to the first waveguide at a first flow rate and a second portion of the pressurized cooling air is delivered to the second waveguide at a second flow rate that is greater than the first flow rate.

8. The radio frequency waveguide communication system of claim 7, wherein the discharge port of a first remote node located at the first end has a first size and the discharge port of a second remote node located at the second end has a second size that is greater than the first size.

9. The radio frequency waveguide communication system of claim 1, wherein the guided electromagnetic transmission network is included in a gas turbine engine of an aircraft.

10. The radio frequency waveguide communication system of claim 9, wherein the cooling air source includes an air cycle machine (ACM) included on the aircraft.

11. The radio frequency waveguide communication system of claim 9, wherein the cooling air source includes a heat exchanger that receives heated bleed air from the gas turbine engine and generates the pressurized cooling air using the heated bleed air.

12. A method of cooling a radio frequency waveguide communication system comprises:
    providing pressurized cooling air via a cooling air source;
    directing the pressurized cooling air to a guided electromagnetic transmission network that includes a remote node in fluid communication with a waveguide; and
    directing, via the waveguide, the pressurized cooling air to a remote node.

13. The method of claim 12, further comprising flowing the pressurized through a discharge port included with the remote node to discharge the pressurized cooling air from the guided electromagnetic transmission network.

14. The method of claim 13, wherein the delivering the pressurized cooling air to the guided electromagnetic transmission network comprises flowing the pressurized air from the cooling air source to an air inlet included in the waveguide.

15. The method of claim 14, further comprising flowing a first amount of the pressurized cooling air to a first portion of the guided electromagnetic transmission network and flowing a second amount of the pressurized cooling air that is greater than the first amount to a second portion of the guided electromagnetic transmission network.

16. The method of claim 15, wherein flowing the first amount and the second amount of pressurized cooling air comprises flowing the first amount of pressurized cooling air to a first remote node including a first discharge port having first size included and flowing the second amount of pressurized cooling air to a second remote node having a second size that is greater than the first size.

17. The method of claim 16, further comprising expelling the first amount of pressurized cooling air at a first flow rate via the first discharge port and expelling the second amount of pressurized cooling air at a second flow rate greater than the first rate via the second discharge port.

18. The method of claim 14, wherein generating the pressurized cooling air comprises:
- outputting preconditioned pressurized cooling air from an air cycle machine (ACM); and
- delivering a portion of the preconditioned pressurized cooling air to the air inlet.

19. A radio frequency waveguide communication system comprises:
- a guided electromagnetic transmission network including a first remote node located at a first location and a second remote located at a second location;
- a waveguide extending from a first portion in fluid communication with the first remote node to a second portion in fluid communication with the second remote node; and
- a cooling air source in fluid communication with the guided electromagnetic transmission network and configured to force pressurized cooling air through the waveguide and to the first and second nodes,
- wherein the guided electromagnetic transmission network varies air flow of the pressurized cooling flowing between the first portion and the second portion.

20. The radio frequency waveguide communication system of claim 19, wherein the guided electromagnetic transmission network flows a first amount of air to the first portion and flows a second amount of air that is greater than the first amount of air to the second portion.

* * * * *